United States Patent [19]

Reiniger

[11] 4,072,273
[45] Feb. 7, 1978

[54] PROCESS FOR DRY RECOVERY OF MATERIALS FROM SOLID REFUSE

[75] Inventor: Haigh McDiarmid Reiniger, Darien, Conn.

[73] Assignee: Southeast SBIC, Inc., Miami, Fla.

[21] Appl. No.: 752,216

[22] Filed: Dec. 17, 1976

Related U.S. Application Data

[60] Division of Ser. No. 427,301, Jan. 7, 1974, abandoned, which is a continuation-in-part of Ser. No. 323,147, Jan. 12, 1973, abandoned, which is a continuation of Ser. No. 818,219, April 22, 1969, abandoned.

[51] Int. Cl.$^2$ .............................................. B02C 23/14
[52] U.S. Cl. ........................................ 241/24; 241/25; 241/29; 241/DIG. 38
[58] Field of Search ...................... 241/24, 25, 29, 30, 241/73, 74, 79, 79.1, 86.1, 188 R, DIG. 38

[56] References Cited

U.S. PATENT DOCUMENTS

| | | | |
|---|---|---|---|
| 3,524,594 | 8/1970 | Anderson et al. | 241/DIG. 38 |
| 3,554,454 | 1/1971 | Gruendler | 241/73 |
| 3,622,088 | 11/1971 | Gunkel | 241/74 |
| 3,741,863 | 6/1973 | Brooks | 241/DIG. 38 |
| 3,790,091 | 2/1974 | Law et al. | 241/79 |

*Primary Examiner*—Granville Y. Custer, Jr.

*Attorney, Agent, or Firm*—David H. Semmes; Warren E. Olsen

[57] ABSTRACT

A solid waste pollution control process for the dry recovery and restoration of 100% recycled paper pulp, machine cleaned confetti thrashed paper, fibrous fuels, plastic materials and construction aggregates from "solid municipal refuse", consisting of municipal household garbage, household yard trash, and commercial trash from supermarkets and retail establishments, condominiums, apartments, offices and warehouses. The solid municipal refuse is automatic machine sorted, machine chopped and thrashed and machine and air cleaned and is subjected to specific gravity and ballistics separation to recover the confetti thrashed paper while eliminating and rejecting from this confetti thrashed paper the loose, soft, decayed, wet and extraneous matter including high density particles and abrasive materials, such as metal particles, grit and glass such that this extraneous matter and materials are separated into fibrous fuels and construction aggregates. The machine cleaned confetti thrashed paper is then digested into fiber pulp from which plastic is removed, and it may be used as wet fiber pulp or alternatively may be air dried and separated into residual plastics and 100% recycled paper pulp suitable for use in making various commercial paper products.

5 Claims, 8 Drawing Figures

Fig. 6.

PROCESS FOR DRY RECOVERY OF MATERIALS FROM SOLID REFUSE

RELATED U.S. APPLICATION

This application is a division of prior U.S. application Ser. No. 427,301, filed Jan. 7, 1974, now abandoned, which in turn was a continuation-in-part of prior U.S. application Ser. No. 323,147, filed Jan. 12, 1973, now abandoned, which was a continuation from the previous U.S. application Ser. No. 818,219, filed Apr. 22, 1969, superseded and now abandoned.

FIELD OF THE INVENTION

The present invention is in the field of solid waste pollution control and relates to the dry recovery and restoration of commercially valuable materials from solid municipal refuse. The terms "solid municipal refuse" and "solid municipal garbage and trash" as used herein are intended to be synonymous and are intended to include municipal household garbage and trash, household yard trash, and commercial trash from supermarkets and retail establishments, condominiums, apartments, offices and warehouses, selected factory wastes such as fiberboard, paperboard, cardboard, carton materials, waste packaging, and agricultural vegetable fibers, silage, bagasse, bark, and other disposable waste municipal, agricultural and commercial materials of a similar nature.

BACKGROUND OF THE INVENTION

Each year vast quantities of such solid municipal refuse are generated by cities, suburbs, towns, and villages, and the disposal of this raw waste has been a very acute national problem for a long period of time. The disposal of this raw waste has led to pollution of or to deterioration of many areas in the nation. The present invention is directed to the alleviation of these problems in commercially useful ways which are beneficial to the environment by recovering and restoring commercially useful materials from solid municipal garbage and trash.

SUMMARY OF THE INVENTION

The present invention provides a solid waste pollution control process and apparatus for the dry recovery and restoration of 100% recycled paper pulp, machine cleaned confetti thrashed paper, fibrous fuels, plastic materials and construction aggregates, and steel and scrap iron from "solid municipal refuse".

Among the advantages resulting from the process and apparatus of the present invention are that they enable materials of commercial value to be recovered and restored from solid municipal refuse. Moreover, the present invention enables these materials to be recovered and restored with dry processing steps, that is, the addition of significant amounts of processing water is not required, which is of further advantage from the environmental protection viewpoint as well as from the processing viewpoint.

The solid municipal refuse is automatic machine sorted, machine chopped and thrashed and machine and air cleaned and is subjected to specific gravity and ballistics separation to recover the confetti thrashed paper while eliminating and rejecting from this confetti thrashed paper the loose, soft, decayed, wet and extraneous matter including high density particles and abrasive materials such as pulverized metal particles, grit and glass such that this extraneous matter and materials are separated into fibrous fuels and construction aggregates. The machine cleaned confetti thrashed paper is then digested into fiber pulp from which plastic is removed, and this pulp may be used as wet fiber pulp or alternatively may be air dried and separated into residual plastics and 100% recycled paper pulp suitable for use in making various commercial paper products.

The methods of the present invention dry separate fractions of trash, such as grit, sand, glass, minerals, small metals, stones, decomposed matter and other undesirable liquids or solids found in solid municipal garbage and trash and extract and recover such specifically defined fibrous and fiber-containing elements as are present in papers, textiles, packaging, corrugated boxes, food containers, wood, vegetable fibers, bark, and other fibrous ingredients of an organic or inorganic origin.

The method and machinery described provide rapid separation, while segregating and controlling the dust, fines, grit, sand, crushed, broken, or shredded glass and metal particles on the one hand from the fibrous-containing portions of the solid municipal refuse. This process enables bulk handling and recovery and restoration of such valuable fibrous materials without prior water soaking or dilution in liquid. The paper and fibrous materials from the solid municipal garbage and trash when recovered and treated by the novel process and apparatus described may then be readily re-processed in a re-constituted form. From the resulting 100% recycled paper pulp fiber obtained a variety of commercial paper products can be made including molded or shaped products, webs, mats or sheets as in papers, paperboards, pulpboards, newsprint, building insulation and sheathing, acoustical tiles, construction panels and boards; structural hardboards for housing fiberboards and vulcanized fiber for industry; or woven and non-woven papers and textiles, carpet backing and wall coverings for interior or exterior use, with or without additives, stabilizers, binders, and the like.

The present invention in one of its aspects provides a dry method for the treatment of solid municipal garbage and trash serving to control solid waste pollution.

In another of its aspects, this invention provides a process for making machine cleaned, chopped and thrashed confetti paper from solid municipal garbage and trash.

In a further aspect, this invention provides a process for the restoration of 100% recycled paper pulp from such thrashed confetti paper.

This invention in another of its aspects provides a method for the recovery of plastics from the restored paper pulp.

The invention provides a method for the recovery of fibrous fuel from solid municipal refuse.

In another aspect of the present invention, it provides a method for salvaging construction aggregates from solid municipal refuse, from the glass, grit and heavier particles therein. These construction aggregates are adapted for use in concrete and bituminous construction and for road ballast.

The term "solid municipal refuse" or "solid municipal garbage and trash" is intended to exclude scrapped machinery and scrapped automobiles, automotive tires and wheels, industrial chemical wastes, oils and greases, sewage and liquid wastes, wire rope and bedsprings, carpeting, construction site trash, restaurant swill and hospital wastes, volatiles, and contaminants.

BRIEF DESCRIPTION OF THE DRAWINGS

FIG. 4 shows an alternative arrangement for certain portions of the apparatus in FIG. 1 for providing additional breaking, tearing and shredding of the incoming refuse. FIG. 4 is an elevational view shown partially in section.

DETAILED DESCRIPTION

Figure 1:
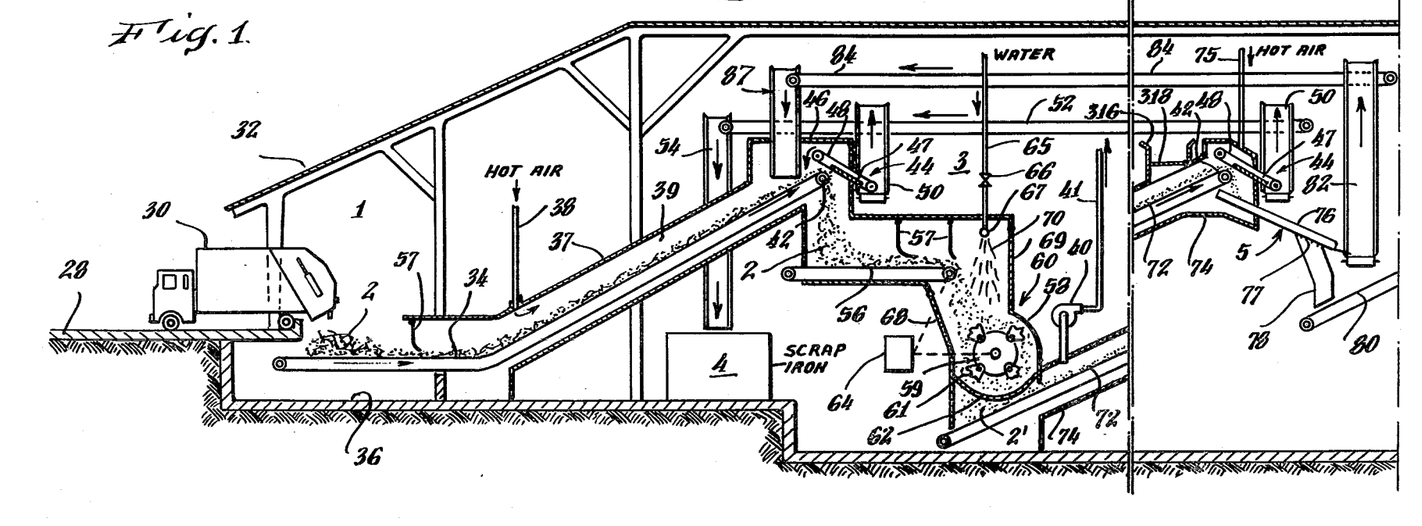
FIGS. 1, 2, and 3 are elevational views, with portions shown in section and portions schematically illustrated, of apparatus arranged to practice the method of present invention. These three FIGURES may be considered together as a panoramic view when arranged end-to-end with FIG. 1 at the left, FIG. 2 in the center and FIG. 3 at the right.

Before describing each of the process steps in full detail, it may be helpful for the reader to give an outline review of the various processing stations shown. In viewing the three FIGS. 1, 2, and 3 arranged in order as mentioned above, the receiving station 1 for delivery of the solid municipal garbage and trash 2 is at the left in FIG. 1. A station for breaking and shredding this raw refuse 2 is shown at 3 and includes electromagnetic separation apparatus, as will be explained in detail further below, for removal of tramp iron and steel particles. The resulting scrap is automatically conveyed to a scrap iron and steel collecting station 4 in readiness for sale to dealers. At the right in FIG. 1 is located an oversize reject screen vibrator station 5 which serves to recycle the oversize lumps of garbage and trash back again through the breaking and shredding station 3.

The shredded and sized raw refuse is then conveyed into a machine treatment station 6 (FIG. 2) containing one or more attrition classification machines 7 which operate, as will be explained in detail further below, to perform several functions including the forming of machine cleaned confetti thrashed paper. This confetti thrashed paper issues from the outlets 8 together with chopped plastic film and very minor amounts of particles of glass, ceramics, grit, and non-ferrous metal. A specific gravity and centrifugal air classification station 9 serves to separate these particles from the confetti thrashed paper and chopped plastic film which are then air conveyed over into an enclosed stock pile 10 at the right in FIG. 2 in readiness for further processing. Alternatively, such pre-treated paper stock 10 can be sold to dealers or to mills which can process it to make corrugated boxes, construction felt, roofing, tubing, container boards, molded pulp, and various paper-containing products.

Figure 2:
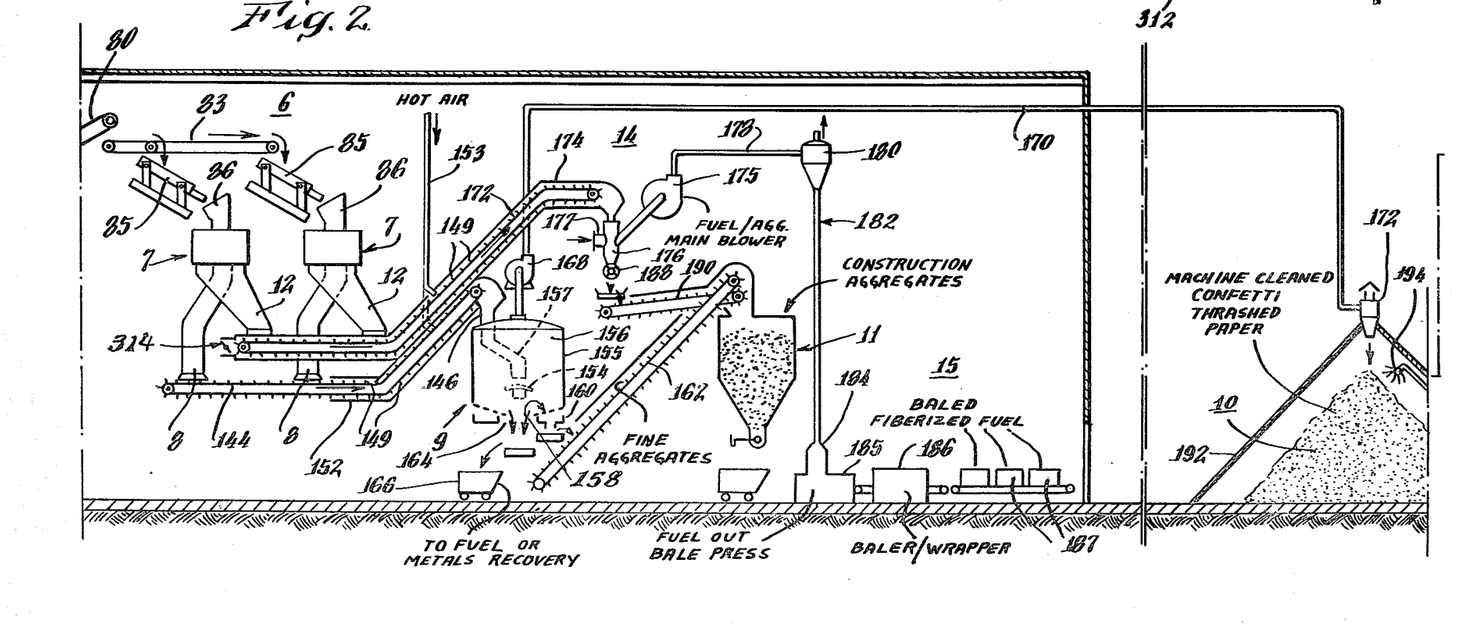

The particles of glass, ceramics, grit and non-ferrous metal which were separated out by the classification station 9 are conveyed over into a construction aggregates storage hopper 11 in readiness to be sold to the construction industry. These construction aggregates in the hopper 11 are suitable for use in concrete foundations and bituminous construction and for road ballast.

From the attrition classification machines 7, the loose, soft, decayed, wet and extraneous garbage and trash matter including the major amounts of high density particles of pulverized glass, ceramics, grit, and non-ferrous metals together with some paper particles and hard plastic particles are discharged at outlets 12. These materials from outlets 12 are conveyed into a second specific gravity air classification station 14 which operates with particles of average significantly heavier weight than those passing through the station 9. The combustible cellulosic, organic, plastic and paper particles are air borne in the classifier 14 and are separated out to be air stream conveyed over into a fiberized fuel baling and delivery station 15. The resulting fiberized fuel can be sold commercially, and this fibrous fuel can also be burned for useful purposes at the site of the process itself, if desired, as will be explained further below. From the air classification station 14 the heavier denser particles of glass, ceramics, grit, hard plastics, and non-ferrours metals drop down onto conveyors and are transferred into the construction aggregates hopper 11. It is noted that the construction aggregate material in the hopper 11 has the advantage of containing a distribution in particle sizes. That is, there is a quantity of fine particles as well as medium size and larger particles as is desirable for use in concrete and bituminous mixtures.

Figure 3:
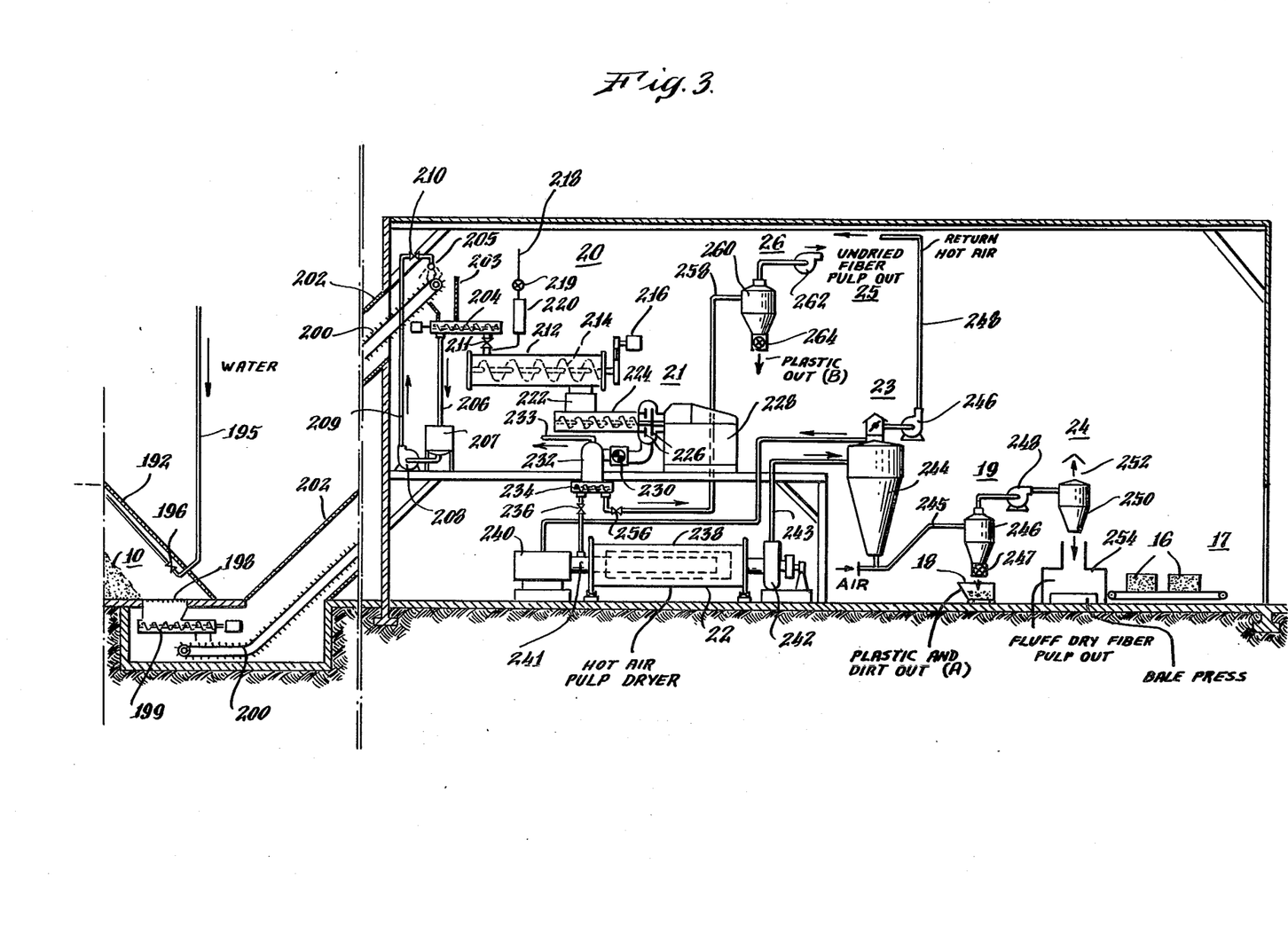

The machine cleaned confetti thrashed paper 10, which may contain some chopped plastic film, depending upon the mix in the municipal garbage and trash 2, may be processed further, as shown in FIG. 3, to recover and restore 100% recycled paper pulp 16 at a shipping station 17. Balled and heat distorted plastic particles 18 are removed from the fine fluff dried paper pulp fiber at a pulp fiber separation station 19.

In the processing of the machine cleaned confetti thrashed paper material 10, as shown in FIG. 3, is passed through a continuous steam cooker digester and sterilization station 20, and then may be passed through an attrition refiner station 21. In station 20 and in optional station 21 any contamination remaining in contact with the machine-cleaned confetti is thoroughly heat dispersed and mechanically agitated under steam pressure. Contaminates may include minor amounts of coatings, laminates, printing, oils, waxes, grease and asphalt and the like, which were previously advantageously mechanically degraded in the machine 7.

The attrition refiner stage 21 is optional and may be omitted in those conditions where the pulp discharged from the digestion and sterilization station 20 through a pressure discharge valve is already in sufficiently defibered condition.

The pulped material is fed through a fluffing and hot air drying station 22, and then through a cyclone separation station 23 wherein the pulp fiber and film and allied plastic particles are separated from hot air, which is returned to an earlier stage in the overall process, as will be explained in detail further below. From the cyclone separation station 23, the dried pulp fiber and plastic particles are air conveyed into the separation station 19, mentioned above, in which the fluff dried paper pulp fiber is separated from the film plastics and any allied extraneous particles so that the 100% restored paper pulp fiber can be air conveyed into a bale press station 24 adjacent to the shipping station 16. Alternatively, the undried fiber pulp from the digestion and sterilization station 20 can be separated in a station 26 from plastic issuing at B with the undried fiber pulp supplied at 25.

An outline review of the various process stations shown has been given, and now each of the process steps and the apparatus will be described in full detail. As shown in FIG. 1 the solid municipal garbage and trash 2 is brought to a ramp 28 by suitable transportation, for example such as by truck 30, and is dumped at the receiving station 1 protected by a roof 32. This raw waste 2 may be dumped directly onto a conveyor 34 as shown, or it may be dumped into a raw waste silo or dumping pit 36 for temporary holding to accommodate variations in the delivery rate and scheduling. Mechanical loading means, not shown, for example such as a front loader, is used to remove the raw waste from the pit 36 and put it onto the infeed conveyor 34.

In order to increase the efficiency of trucking and delivering this solid municipal refuse 2, it may be compacted at the sites where the trucks are loaded or the trucks 30 themselves may be equipped for compaction. One of the numerous advantages of the process and apparatus embodying the invention is that there are no critical factors with respect to the amount of compaction or the mix of the various components in the solid municipal garbage and trash. For example, on Mondays and Tuesdays the raw refuse 2 may contain a larger proportion of newspapers and yard trash due to the collection of large Sunday newspapers or from work on yards over the week-end, and so forth, depending on people's changing activities during the week and during various seasons. In other words, the process of the present invention has great flexibility in handling the solid municipal refuse 2 in whatever component mix it happens to arrive day-by-day.

The in-feed conveyor 34 for the raw waste 2 is enclosed by a housing 37, and a duct 38 may be arranged to supply hot air which travels up through the in-feed passage 39 to apply a drying effect to the raw waste 2. Also, this forced flow of hot air through the enclosed in-feed passage 39 helps to control the odor from the raw waste 2. A suction blower 40 draws the hot air through the in-feed passage 39 and also through the breaking and shredding station 3. The discharge duct 41 from the blower 40 may lead into the combustion chamber of the steam boiler (not shown) to incinerate the odors, or alternatively into a gas scrubber chamber (not shown), or both, so as to provide further control over odors. The conveyor housing 37 is provided with removable panels serving as access ports at frequent locations along the length of the conveyor.

It is to be understood that the enclosure 37 and the duct 38 can be omitted, if desired, inasmuch as a very effective drying action is applied to the broken and shredded refuse following the station 3, as will be explained further below.

The in-feed conveyor 34 is shown as a belt conveyor which is inclined upwardly as it runs through the passage 39. The upper end of this conveyor passes around a conveyor discharge roller 42 which is positioned near to a magnetic separator apparatus 44 in the entrance chamber 46 to the breaking and shredding station. An electromagnet 47 attracts the tramp iron and steel pieces as the raw refuse tumbles over the roller 42, and a revolving belt 48 running continuously past the lower face of this magnet 47 carries the iron and steel pieces over onto a conveyor 50. This conveyor 50 loads the scrap iron onto another conveyor 52 which, in turn, dumps the scrap iron down a chute 54 leading to the collecting station 4. It is to be understood that any suitable conveyance arrangement may be used to deliver the removed scrap iron and steel to its collecting station 4.

The solid municipal garbage and trash 2, from which much of the iron and steel has now been removed, falls down onto a feed control conveyor 56 running beneath a plurality of heavy curtains 57. These curtains 57, in conjunction with conveyor 56, serve to regulate and smooth out the flow of the refuse into the housing 58 of the breaking and shredding apparatus 60 and they also confine the dust in this apparatus. A rotor 59 carrying pivoted hammers 61 is positioned above a grate 62, so that these hammers break and tear the refuse against the housing 58 and primarily against the bars of the grate 62. The rotor 59 is driven by mechanism schematically illustrated at 64. This mechanism 64 also includes a drive for the feed control conveyor 56 and a control which maintains the feed rate of the conveyor 56 matched to the operating rate of the breaking and shredding apparatus 60.

In order to aid in dust control a water pipe 65 equipped with a valve 66 supplies a spray head 67 positioned over the rotor 59 to create a dust settling spray 70 directed down toward the rotor. There are explosion relief doors 68 and 69 in the housing 58.

Figure 4:
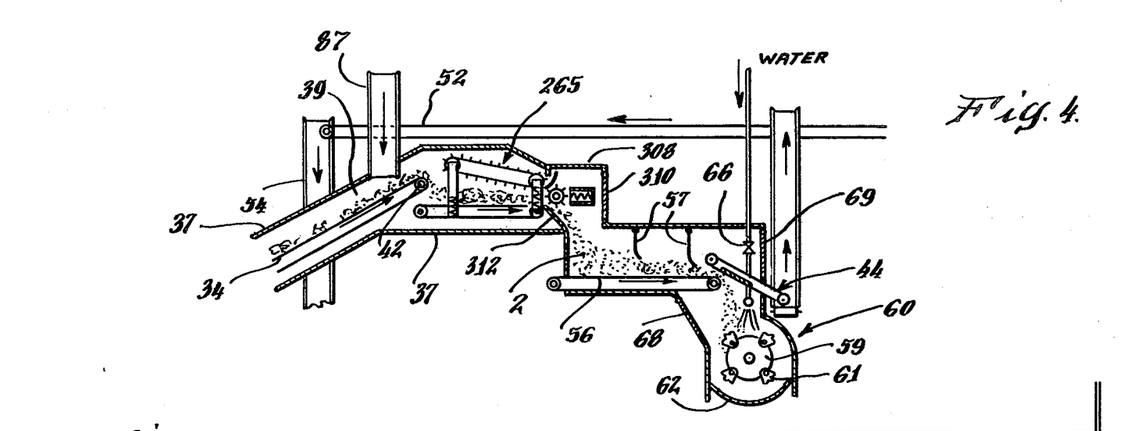
Figure 5:
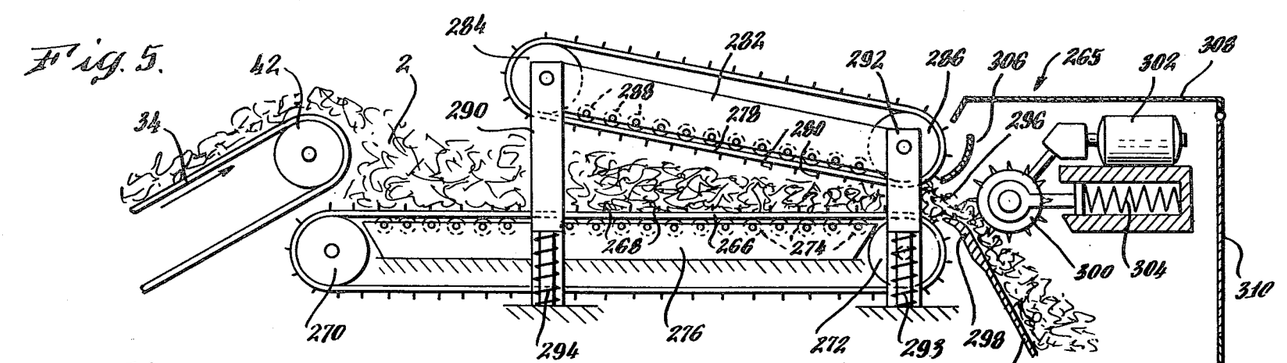
FIG. 5 is an enlargement of the apparatus appearing in the central area of FIG. 4.

The breaker-shredder apparatus 60 serves to reduce the size of the raw waste 2' to pieces in the range from approximately one-half of an inch to six inches suitable for feeding into the treatment machines 7 as will be explained. It is to be understood that if one stage of breaking and shredding apparatus 60 is not sufficient, then a secondary shredding stage may be used in sequence with the apparatus 60 to assure that the desired amount of size reduction and shredding is achieved. Also, shredding apparatus as shown in FIGS. 4 and 5 may be included between the infeed conveyor 34 and the feed control conveyor 56, as described further below.

The specific equipment utilized in the breaking and shredding station 3 to perform the breaking and shredding of the solid municipal garbage and trash is not critical so long as it is sufficiently powerful and effective to operate on the incoming refuse in its "as is" condition and so long as it achieves the size reduction discussed above.

The broken and shredded refuse 2' passes through the grate 62 and drops onto a conveyor 72 leading up to another discharge roller 42 positioned near a second magnetic separator apparatus 44 similar to the one already described. The removed iron and steel scrap is dropped by the separator 44 onto a conveyor 50 which delivers it onto the conveyor 52 for conveyance to the scrap iron collecting station 4. The conveyor 72 is enclosed in a housing 74 forming a tunnel dryer, and hot air is supplied through a duct 75 into the housing 74 near the discharge end of the conveyor 72. This hot air flows almost the entire length of the tunnel dryer 74 passing the broken and shredded refuse being carried up by the conveyor 72 to provide a pre-drying action. The hot air is drawn by the suction blower 40, as discussed above. The hot air within housing 74 serves to reduce the moisture content of the broken and shredded garbage and trash 2' before its entry into the treatment machines 7, and preferably this moisture content is reduced to a range from 20% to 50% of the oven dry basis weight of the solids being fed into the machines 7.

These machines will operate satisfactorily when a lesser amount of moisture is present and they will operate satisfactorily when a greater moisture content is present, but best results are obtained in this range. It is a significant advantage of the treatment machines 7 that they are capable of operating upon shredded solid municipal garbage and trash over a very wide range of moisture content, as may occur from day-to-day due to climatic changes and changes in the constituent mix of the garbage matter.

After passing the second magnetic separator apparatus 44, the broken and shredded refuse travels along a screen vibrator 76 in the oversize rejection station 5. Shredded refuse of the proper size range, i.e., approximately one-half of an inch to six inches as previously noted, passes through the screen 77 and drops down a chute duct 78 onto a conveyor 80. The oversize rejects pass onto a conveyor 82 feeding to a return conveyor 84 leading to a chute 87. This chute 87 is directed onto the infeed conveyor to recycle the oversize fragments and pieces back through the breaking and shredding station 3.

As shown in FIG. 2 it is desirable to utilize a plurality of the treatment machines 7 to increase the capacity of the overall system. In order to distribute the shredded and sized refuse equally among the respective machines 7 the screen vibrator 76 includes dividers defining a plurality of lanes equal in number to the number of the treatment machines 7. From each of these lanes a chute duct 78 directs the refuse onto a conveyor 80 leading to the respective machine 7. At the left in FIG. 2, the respective conveyors 80, and 83 are shown delivering the shredded and sized refuse into respective vibratory feeders 85 directed into the infeed hoppers 86 of the respective treatment machines 7.

Figure 6:
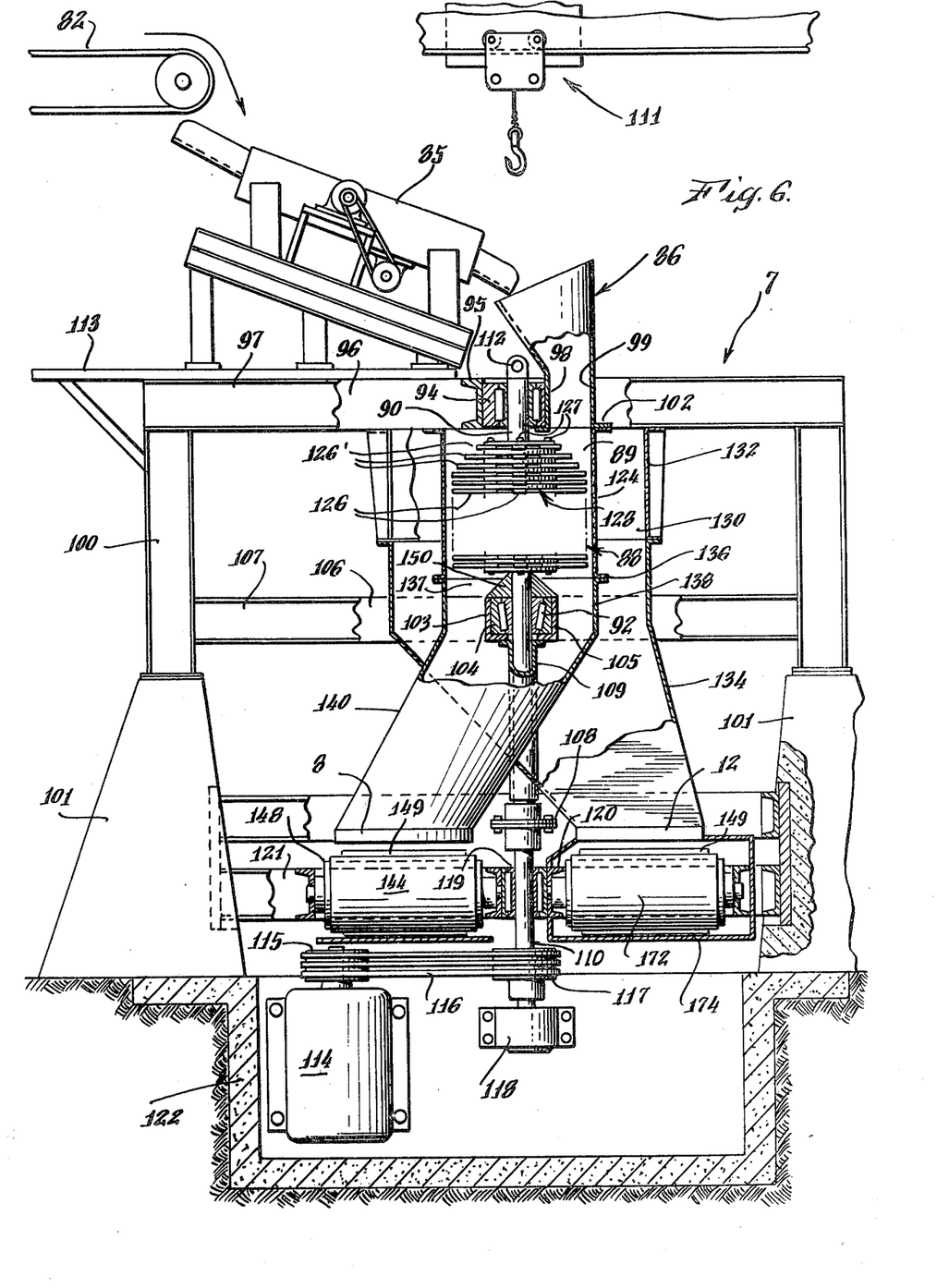
FIG. 6 is an elevational sectional view on greatly enlarged scale of the machinery seen at the left in FIG. 2.
Figures 7, 8:
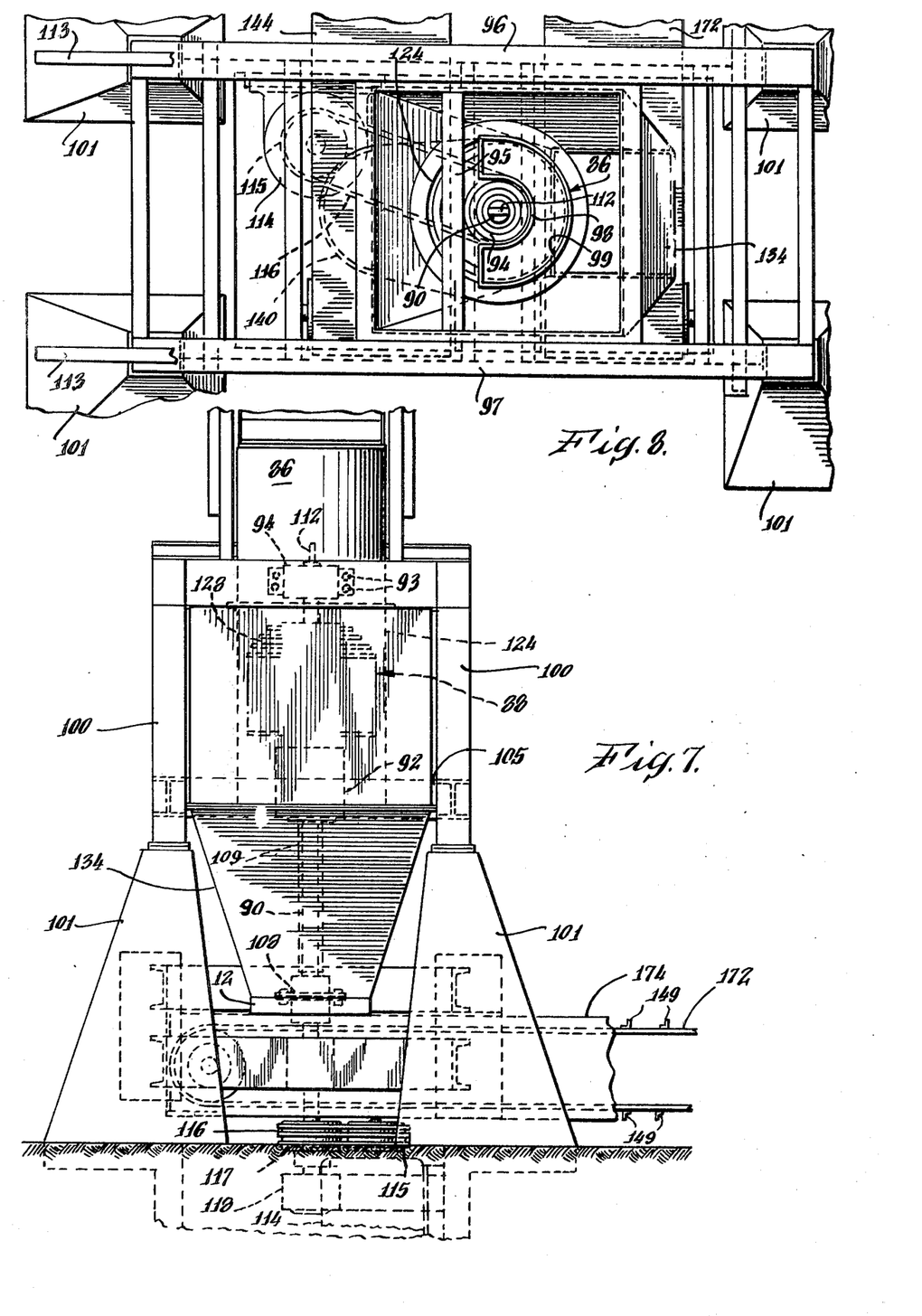
FIG. 7 is an end elevational view of the machinery of FIG. 6 as seen from the right in FIG. 6.
FIG. 8 is a top plan view of the machinery shown in FIGS. 6 and 7.

To explain the operations performed and the advantageous features of these treatment machines 7, reference is now made to FIGS. 6, 7 and 8. The machine 7 includes a rotor assembly 88 located in a rotor chamber 89. The rotor assembly 88 is secured to a rotatable vertical shaft segment 90 journaled within lower and upper bearings 92 and 94. These bearings 92 and 94 are removably mounted on the framework of the machine so that the whole rotor assembly 88, together with its shaft segment 90 and bearings 92 and 94 are designed to be removed as a unit from the machine 7 for convenience in servicing and to minimize maintenance "down-time" of the machine. A complete replacement rotor package, including shaft segment and bearings, can be kept on hand to be inserted into the machine so that the machine can be returned to service promptly without taking the machine out of service to replace or repair individual parts.

The upper bearing 94 is removably secured by bolts 93 (FIG. 7) to the vertical face of a transverse brace 95 (see also FIG. 8) extending between main top beams 96 and 97 of the machine frame 100, which is supported on four concrete piers 101. This transverse brace 95 is removably attached at its ends to the parallel top beams 96 and 97. The brace 95 is offset to one side of the vertical axis of the shaft segment 90, so that the lower part of the in-feed hopper 86 can be arranged in a semi-circular pattern, as seen in plan view in FIG. 8 extending more than 180° around the axis of the shaft segment 90. With this arrangement, the semicircular in-feed hopper provides a large capacity for passing the shredded refuse down into the rotor chamber 89. The upper end of the hopper converges as a funnel entrance, but the inner and outer walls 98 and 99 of the lower portion of the hopper are cylindrical and parallel where they nest around the bearing 94 to freely admit the refuse directly into the rotor chamber without any tendency to choke. Thus, the in-feed is designed for controlled throughput of the shredded refuse 2'. The entire hopper 86 has a quick removal fastener arrangement at 102.

The lower bearing 92 is removably seated in a socket 103 between a pair of transverse braces 104, 105 of L-shaped cross section extending between beams 106, 107. The braces 104, 105 are arranged with their flanges toward each other, as shown in FIG. 6, to help support bearing 92. The shaft segment 90 is detachably coupled by a coupling 108 to the main drive shaft 110 shrouded by fixed tube 109.

To remove the rotor assembly, a lifting crane 111 is hooked into the eye 112 at the upper end of the shaft segment 90; the bearing 94 is detached from the brace 95; and this brace is unfastened and removed from beams 96 and 97. The coupling 108 is removably attached to the lower end of the shaft segment 90, for example, as by a splined connection, and this coupling is now disconnected from the shaft segment 90. The vibratory feeder 85 is slidably mounted on a track 113, so that it can be quickly retracted.

The shaft segment 90 is now ready to be lifted as a unitized assembly together with its rotor assembly 88 and bearings 92 and 94 by using the lift eye 112 (FIG. 6) at the upper end of this shaft segment. In this way, the entire rotor assembly becomes quickly accessible as well as the entire screen means, to be described.

A polyphase electric motor 114 serves to drive the main shaft 110 and rotor assembly 88 through a pulley 115, multiple belts 116, and a pulley 117 on the shaft 110 and coupling 108. These pulleys 115 and 117 can be removed and replaced by pulleys of other diameters for changing the speed of the rotor assembly 88. The shaft 110 is supported by a thrust bearing 118 and by a bearing 119 held by a brace and beam structure 120 and 121. An advantage of mounting the motor and drive at the foundation 122 is that it minimizes machine vibration and clears the in-feed region for maximum throughput.

The machine frame 100 is arranged to accommodate the mounting of the motor 114 at the top of the machine, if desired. Then the shaft segment 90 is extended up above the bearing 94 to receive the pulley 117 and the lifting eye 112 is located above this pulley. With this alternative motor location, the bearing 92 is arranged as a thrust bearing and the shaft 90 terminates at this bearing.

Regardless of which motor location is employed, it is noted that there is a bearing 92 and 94 both below and above the rotor assembly 88 to provide a firm support for this rotor assembly and to hold the shaft rigidly in concentric relationship with respect to the fixed screen means 124, described below.

Surrounding the rotor chamber 89 are cylindrical screening means 124 formed by a plurality of drilled or perforated arcuate plates fastened together to define the desired cylindrical shape. The rotor assembly 88 includes numerous cutting elements 126 extending horizontally radially outwardly from the rotor hub 128. These cutting elements 126 are shown as being pivotally mounted on axially extending pivot rods 127 passing through holes in multiple parallel discs comprising the hub 128, and they are formed of tough steel. Alternatively, the cutting elements 126 may be fixed in radial position on the rotor hub 128, if desired. As shown, these elements 126 have a vertical thickness of approximately one-quarter of an inch, a radial length in the range from 8 to 10 inches, and a width from 2 to 2½ inches, acting as a balanced high speed rotor fan.

The diameter of the rotor hub 128, for example, is approximately 18 inches, providing an overall diameter of the assembly of approximately 36 inches for the rotor assembly 88 as a whole. This size is given as an example only, for smaller or larger diameter rotor assemblies 88 can be employed and longer or shorter cutting elements 126 can be employed. The numbers and relative lengths of these cutting elements 126 can be adjusted to accommodate the condition of the shredded refuse usually encountered at the in-feed of this equipment. The upper tiers 126' of the cutting elements act as impellers and they are progressively shorter to facilitate downward passage of the refuse into the high speed treating zone 89 between the screening means 124 and the rotor assembly. As shown in FIG. 6, there are three tiers of these shorter cutting elements 126' having graduated relative lengths of approximately one-quarter, one-half, and three-quarters that of the lower full-sized elements 126. These shorter cutting elements 126' may have a progressively increased thickness as their length is decreased and they may be spaced apart by an increased vertical spacing as their length is decreased to provide powerful chopping and feeding action on the incoming refuse. Also, these upper cutting elements 126' may be staggered in position with respect to those above and below. The rotor assembly 88 in the machine, as shown, has an axial length of approximately 30 inches. Adjustments in the numbers of rotor elements 126 may be made to increase or decrease the amount of attrition classification occurring. The effective length of the rotor assembly 88 can be increased or decreased by adding or removing these cutting elements 126. The length given is by way of example, for longer or shorter rotor lengths can be employed. The rotor chamber 89 defines a high speed treating attrition classification zone in which various advantageous functions occur, as described below.

It is desired to have a relatively small clearance between the tips of the cutting elements 126 and the screen means 124, for example, of the order of one-eighth of an inch up to one inch.

The rotor assembly 88 is driven at a high speed, for example, in the range from 600 r.p.m. up to 2500 r.p.m. For example, between 1000 r.p.m. and 1200 r.p.m. the tip speed of the elements 126 is approximately 10,000 feet per minute. Advantageously, the rotor assembly 88 can be reversed in direction to increase the operating life of the machine, which may be accomplished by reversing the rotation of the polyphase motor 114.

The cutting elements 126' and 126 serve to apply severe chopping, cutting, scrubbing, scraping and thrashing actions simultaneously on the refuse while abrading and sweeping the refuse against the cylindrical screen means 124 at high speeds. Moreover, a technical surface treatment is achieved by intense scrubbing of the paper and fiber contained therein resulting from the tips of the elements 126 propelling these fibrous constituents along the inner serrated edges of the perforated holes in the surfaces of the cylindrical screen means 124. Thus, such treatment also eliminates and rejects virtually all loose, soft, decayed, wet and extraneous matter, including high density particles and abrasive materials, such as metal particles, grit, glass and heavy plastic pieces.

This extraneous matter is ballistically driven through the perforated openings in the screen 124 and enters an annular chamber 130 surrounding the cylindrical screen means 124. This annular chamber 130 is located between this screen and an outer concentric cylindrical wall 132. This wall 132 extends down and joins a large discharge duct 134 extending down to the outlet 12. The screen 124 is connected at its lower flange 136 with a cylindrical wall 138 which joins a downwardly extending duct 140 running to the outlet 8 at the lower end of this duct 140. The materials passing down into the duct 140 include machine-cleaned confetti, thrashed paper, together with some chopped plastic film particles.

It is to be noted that the surfaces of paper particles passing down through the duct 140 have advantageously been severely abraded at high speeds against the screen plates 124. In this way, the bonding of the cellulose fibers contained therein have been mechanically loosened and prepared for restoration into valuable and useful paper pulp.

Advantageously, this treatment serves to remove garbage contamination by providing an intensive mechanical attach upon the paper surfaces to break the surface tension, loosen and expose the fiber, and being particularly advantageous for reduction of the recovered paper into a new technical cellulosic pulp without contamination. This severe scrubbing, thrashing and scrapping action of the attrition classifier also loosens the bonding of printing inks, laminates, adhesives or coatings. The resulting treated paper is therefore made immediately available for recovery of pulp fiber, if desired, under a fast continuous digester cooking action, as will be explained further below, as well as providing this useful machine-cleaned confetti waste paper product.

In summary, the attrition classifier cuts, chops, thrashes, scrapes, impacts and abrades the materials between the edges of rotor blades against a fixed screen means 124 having abrasive walls by virtue of perforations, drilled holes, punched holes, with or without edges or channels included. The high speed rotor pulverizes loose constituents of the garbage and trash and develops ballistics separation of all particles being bombarded against the screen means. Thus, any materials having a tendency to disintegrate under the intensive treatment, or by virtue of size or weight, will be thrown centrifugally through the openings. However, the usual grinding up of all materials indiscriminantly, as seen in crushers, shredders and disintegrators does not occur in the highly selective subject attrition classifier, which retrieves at outlet 8 the chopped, high strength papers, and films. Oversize particles of wood, plastic or light metal are later air classified and removed, as described herein, although they form only a minor fraction of the bulk paper materials recovered at outlet 8 and not passing the screen means.

Actual usage by the inventor employing solid municipal garbage and trash has shown that the attrition classification machine 7 should be arranged so that an average within the range of 40% to 60% by dry weight of the materials passes through the respective outlets 8 and 12. The material which is driven through the openings in the screen means 124 into the annular chamber 130 and then passing through the outlet 12 includes large amounts of uniformly pulverized combustible fiberized materials and aggregate materials.

While the materials are quickly disintegrated and become a portion of the fiberized fuel and aggregate fraction separated through the attrition classification, the useful paper and packaging products retain substantial strength and resistance to disintegration and thereby may be assessed advantageously and selectively classified under the conditions of the intensive treatments described herein so as to reach the outlet 8 in a suitable and specifically advantageous condition.

In summation, this novel attrition classification method has been shown to be far superior to any other treatment known to the inventor for waste recovery and reuse of solid municipal garbage and trash having the intrinsic process characteristics to recover virtually 100% of the solid wastes for purposes of resouces recycling in the described dry process of this invention.

An example of an item of garbage or trash, formerly incinerated, but which contains valuable fiber that is very difficult to recover and restore as a paper pulp, is the widely used coated milk carton. The attrition classification machine 7 acts to severely rupture and abrade the surface coatings on both faces and exposes the fiber while cutting and chopping portions of the carton into small pieces. The surface impactions caused by the thrashing action of the rotor elements 126' and 126 disrupt the coatings and whip the fibers to further loosen the particles while abrading the printed portions away from the fiber surfaces. Thus, the fibers of the milk carton and pre-conditioned and mechanically cleaned and prepared before reaching the digester for cooking under steam pressure for restoration into high quality chemical paper pulp.

An example of solid municipal garbage and trash supplied by an American city sanitation department which was first shredded and then passed through an attrition classification machine having a rotor assembly with an overall diameter of 18 inches operating at approximately 1200 r.p.m. is as follows:

| Analysis of Materials Not Passing Through the Screen Means: | |
|---|---|
| | Parts by Weight: |
| Dry Paper | 300 |
| Plastic Film | 14 |
| Glass, Ceramics, Grit | 1 |
| Non-Ferrous Metals | 1 |
| Total | 316 |
| Percent of Total Input | 54% |
| Analysis of Materials Passing Through the Screen Means: | |
| | Parts by Weight: |
| Dry Garbage and Plant Material | 95 |
| Dry Paper | 79 |
| Glass, Ceramics, Grit | 57 |
| Non-Ferrous Metals | 28 |
| Hard Plastic | 14 |
| Total | 273 |
| Percent of Total Input | 46% |

Thus, it is seen that the percent by weight of the total input reaching outlets 8 and 12 are approximately 54% and 46%, respectively.

Minor changes in the speed of the rotor assembly 88 will produce marked changes in the amount of attrition and thus the relative percentage by weight passing through the screen means 124. An increased speed produces a significantly greater attrition and an increase in the percentage by weight of the input which reaches the outlet 12. In actual practice, under normal conditions, if the user finds that the average dry weight of the materials passing through the respective outlets 8 and 12 is not within the range of 40% to 60% of the input feed by gross dry weight, then the speed of the rotor may be adjusted accordingly.

Increasing the size or the number of openings in the screen means for a given rotor speed and for a given thickness of the cutting elements 126 will increase the percentage of materials passing through the openings in screen means 124 to reach the outlet 12.

In the numerical example cited above, the screen means employed had openings one-quarter of an inch in diameter spaced one inch on centers. However, this is by way of example only, because smaller and larger sizes of openings have also been successfully used. Also, in this example, the cutting elements had a thickness of one-fourth of an inch. However, this is by way of example only, because thinner or thicker cutting elements may be used. In general practice, thicker blades may be employed with longer wear life, but a reduced cutting and decreased selectivity occurs, if the blades are made unduly thick.

It is to be understood that the elements 126 act as fan impellers producing a flow of air cut through the openings of screen means 124 into the annular chamber 130. This flow of air assists in clearing the lightweight particles through the openings into the chamber 130. In other words, the decayed and disintegratable material which becomes the fiberized fuel particles are blown and driven by the rotating element 126 through the screen openings into chamber 130. In distinction, the heavier and denser particles, i.e. glass, ceramics, grit, non-ferrous metals, and hard plastics, primarily are passed through the screen openings by being ballistically propelled therethrough by the rotation elements 126.

The cylindrical screen means 124 is shown as being formed by a plurality of drilled or perforated cylindrically curved plates fastened together to define the desired cylindrical shape. It is to be understood that these screen means 124 can be formed in other ways, for example, by welding bars together to form a screen grate of cylindrical configuration, by use of corrugated or expanded metals, by use of flat perforated or punched sheets of metal followed by subsequent forming into a cylindrical shape or by use of a variety of metal castings. It is important that whatever construction is used, the screen means 124 must be sufficiently strong to withstand the stresses and loads incurred over sustained periods of operation.

An example of a suitable range of sizes of the openings in screen means 124 is from one-eighth of an inch up to one inch. The spacings between openings and the opening sizes determines the throughput, i.e. determines the relative percent by weight of total input reaching the screen outlet 12. A decrease in spacing or an increase in opening size, or both, increases the throughput, thereby making it possible to more accurately control the final product mix issuing from the first and second outlets 8 and 12, respectively.

To prevent the paper and film particles from piling up on the transverse braces 104 and 105 where they pass through the chamber 137 below the rotor chamber 89, there is an A-shaped deflector 150 covering the tops of these two braces 104 and 105. Thus, the material in the chamber 137 is encouraged to slide down the sloping surfaces of this deflector 150. It is to be understood that the center section of deflector 150 is located over the bearing 92 and is detachable to permit the removal of the bearing 92 when the rotor assembly is lifted out of the chamber 89, as discussed above.

The confetti thrashed paper and film particles passing through chamber 137 into duct 140 issue through the outlet 8 onto the conveyor 144 leading to the in-feed hopper 146 of the specific gravity and centrifugal air-classifier apparatus 9. This conveyor belt 144 passes over rollers 148 positioned closely adjacent to the outlet 8. As shown in FIGS. 6 and 7, these rollers are mounted upon the beam structure 121 near the foundation for the machine 7. The conveyor belt 144 may be equipped with a sequence of cleats 149 (FIG. 2) to aid in carrying the film and paper particles up into the in-feed hopper 146.

A tunnel dryer 152 is incorporated with the conveyor 144, being supplied with hot air through a line 153. The purpose of this tunnel dryer 152 is to give improved moisture control at the infeed hopper 146 of the classification station 9. Thus, this station 9 is provided with material, which have been previously conditioned through the attrition classification station machine 7, and the further tunnel drying to give consistent and uniform separation in the air classification station 9 for the recovery of machine cleaned confetti thrashed paper.

In the station 9 is a centrally located spinning impeller disk 154 for ballistically distributing high density particles toward the walls 155 of the chamber 156. A duct 157 leads down from the infeed chute 146 to direct the material onto the central spinning plate 154. The high density particles are trapped by screens 158 and fall into pans 160 to be fed onto a conveyor 162 as fine aggregates. Oversize particles of aluminum foil, wood, and pieces of plastic, as solids pass down through a central opening 164 leading to a suitable collection point 166, for example such as the hopper car shown, serving to collect materials for fuel combustibles or for metals recovery. The conveyor 162 is directed to the storage hopper station 11 for construction aggregates.

Directing attention again to the classification station 9, it is noted that air rushes up through the chamber 156 drawn by a blower 168. Thus, a forced air flow in chamber 156 acting in conjunction with the spinning impeller 154 provides specific gravity and centrifugal separation of the light weight air borne confetti paper and air borne plastic film particles from heavier extraneous constituents described above. These air borne paper and film particles are drawn up into the blower 168 and are conveyed through line 170 into the stock pile 10 via a discharge cyclone 172. The machine cleaned and technically prepared confetti paper having been recovered by the machine treatment operations described heretofore is suitable for direct and immediate restoration as a high quality paper pulp. Also, it can be sold as is for use as previously described for a broad application in paper containing products.

The material issuing through the outlet 12 from the attrition classification machines 7 reaches a conveyor 172 directed to the classification station 14. This conveyor 172 is fully enclosed by a housing 174 forming a tunnel dryer supplied with hot air from the line 153 to provide moisture control for improved air classification of fibrous fuels in the classification station 14. The gravity classifier 176 shown is suitable for removing the heavy weight particles of glass, ceramics, and nonferrous metals from the fiberized combustibles to be used as fuel. A fuel/aggregate main blower 175 has its suction side connected to the gravity classifier 176. Air enters through the inlet 177, and the fiberized fuel is air conveyed through the blower 175 and a line 178 into a cyclone collector 180 to remove the air from the air-entrained fiberized fuel which passes through a line 182 to the fuel discharge station 184 which may contain a bale press 185 and a baler or wrapper 186 for baling the fuel into bales 187.

This air-entrained fiberized fuel containing large portions of cellulose and other combustibles has been thoroughly air entrained and machine screened to a uniform semi-pulverized consistency having particles which are generally less than one-half of an inch in size. This fuel is a low sulphur and low ash fuel. It is a fuel which can be readily baled, extruded, pelletized, or converted into cakes or logs or briquetted for fireplace and campfire fuels, or burned to provide heat, steam.

By virtue of its fiberized condition and high cellulose content this material can be employed as an industrial fiber for re-use in many commercial products and construction materials, such as building boards, asphalt roofing, acoustical wallboard, and the like. Bacteriacides, preservatives or fortifiers can readily be incorporated if desired by commercial consumers utilizing this thoroughly classified and fiberized material.

Directing attention again to the fuel/aggregate classification station 14, the aggregate constituents including glass, ceramics, grit and non-ferrous metal particles pass from the classifier 176 through a discharge valve 188 leading into enclosed conveyor means 190 directed to the construction aggregates hopper 11.

The machine cleaned confetti thrashed paper 10 (FIGS. 2 and 3) is shown enclosed by a storage building 192. A water spray head 194 may be provided to maintain moisture control, being supplied by a water line 195 through a valve 196. The paper material 10 is removed from the storage building 192 through a grating 198 into a screw feeder 199 leading to a conveyor 200 within an enclosure 202 and directed into the head box 203 of a screw feeder 204. A shower spray head 205 controls the moisture content of the paper material 10 in the headbox 203 for purposes of compaction in the screw feeder to form a feedable mass therein. Excess water passes through a drain line 206 into a suitable holding tank 207 for recirculation by a pump 208 through a line 209 and valve 210 to the spray head 205.

The screw feeder 204 forces the wet paper material (containing at least 30% internal moisture but usually at 65% to 75% equilibrium moisture content on an oven dry weight basis) through an infeed 211 into a continuous steam cooker digester and sterilizer 212. This digester 212 is a pressure vessel and operates under an internal steam pressure preferably above 25 p.s.i. and at high temperatures while the paper material is being continuously mechanically agitated by a screw feeder 214 driven by a drive 216. Thus, the steamed paper material is thoroughly blended at a temperature above 250° F and the fibers are loosened. Furthermore, such minor amounts of contaminants as might have remained with the machine cleaned confetti thrashed paper (for example, such as asphalt, grease, oils, waxes, fats, adhesives, and binders) are thoroughly hot dispersed in the presence of the steam, heat, pressure, and aggitation. Also, the action of this station 20 is to degrade any plastics, films, synthetics, glues, tapes, coatings, laminates, saturants, prints, inks, starch fillers, and the like. The plastics and plastic films become balled up which facilitates their subsequent separation from the fiber pulp. The net result is the decontamination of the cellulosic materials by dispersal of these contaminants and degraded materials throughout the mass of machine treated paper confetti. In addition the pulp fiber is sterilized by the heat in the apparatus 212 in which temperatures are above 250° F and preferably above 300° F and may range up to 400° F. The steam is supplied by a line 218 through a valve 219. A superheater 220 is desirable to raise the steam temperature without greatly raising pressure in the digester 212. The hot steam may be introduced into the pressure vessel 212 at one or more points, and is shown here as being introduced near the infeed 211.

The previous machine treatment advantageously prepared this thrashed confetti paper material and exposed the fiber therein for quick cooking and provides for complete restoration of the cellulose fibers without loss of their chemical properties, without damage to the fibers and without loss of strength of the fibers. The resulting fibers are of high tenchnical quality for making paper products.

From the pressure vessel 212 the fiber is discharged through a nozzle assembly 222 into a pressurized refiner stage 21 which includes a screw feed assembly 224 leading to a pair of relatively rotatable attrition members, such as disc plates 226. The rotating attrition members 226 are driven by a powerful drive mechanism 228 having adequate power for readily handling large tonnages of through-put. This attrition refiner 21 has close tolerance between the relatively rotating attrition members for rendering the fibers more flexible and for further separating the fibrous elements thereof, i.e. for defibering the stock. After this refining, the fiber passes through a stock discharge valve 230 into a blow tank 232 having means 233 for pressure relief.

The refiner station 21, including the feed screw assembly 224, refiner element 226, drive 228 and stock discharge valve 230, is optional. When the refiner station 21 is omitted, the digester discharge nozzle assembly 222 is connected into the blow tank 232. To reduce the possibility of damaging the pulp fiber due to sudden pressure release upon discharge from the pressure vessel 212, a modest steam pressure is maintained in the digester 212 while holding a high temperature therein for example, by use of superheated steam as shown.

The refiner station 21 may optionally operate at atmospheric pressure, in which case it is located at the output 234 from the blow tank 232.

The output 234 of the blow tank includes a screw feed which may be operated in either direction to produce either fluff dry fiber pulp or undried fiber pulp, as may be desired at any given time. To make the fluff dry fiber pulp, the stock is fed through a shut-off valve 236 into a hot air pulp dryer station 22 shown as having a rotary dryer 238. A hot air furnace 240 using clean oil or gas or any clean source of energy supplies hot air into the dryer 238. The hot air from the furnace 240 entering the rotary dryer at 241 is at a sufficient temperature to provide a powerful drying action on the fiber and a strong degrading, distorting, shrinking action on any piece of plastic film present. The fiber is thoroughly exposed to the hot air in this dryer, for example by introducing the fiber at 241 directly into the entering hot air stream. The dryer may be arranged to tumble and fluff the fiber to assure thorough exposure to the hot air and render it fluff dried. It is advantageous that the precooked fiber enter the dryer station 22 while the fiber retains much of its high temperature from the digester vessel 212, for example being at least 150° F. to economize in its drying.

A blower 242 at the output of the dryer propels the fluff dried material through a line 243 into a separation station 23 containing a cyclone separator 244 in which the solids are separated from the hot air. A blower 246 returns the hot air through a duct line 248 to the respective hot air lines 38, 75 (FIG. 1) and 153 (FIG. 2).

The solids from the separator 244 pass down into an air conveyor line 245 leading to another cyclone separator 246 in the film and allied plastics recovery station 19. Advantageously, the pulp fiber is now in a low moisture fluffed condition while the plastic film particles were heat distorted and balled in the digester and secondly in the dryer station 22, and thus they are denser and heavier than the fluff dried pulp fibers. This clear-cut difference in densities permits an exacting and precise classification and extraction of the degraded plastics and extraneous materials which pass out through a discharge 247 into the collection station 18.

It is noted that this is a separation of heat distorted, balled, degraded plastics from fluff dried pulp fibers, which is entirely different in concept and operation from attempting to separate the plastic film per se from garbage and trash per se or from waste paper per se.

It is an advantage of this process and apparatus that plastic materials (A) are recovered at station 18, although partially degraded. These plastics (A) at collection station 18 may be recovered and reused by plastic convertors and processors. Otherwise they can be disposed of as a minor portion of the fuel output from the overall process.

The fluff dry paper pulp procedes through a blower 248 into a discharge cooling cyclone 250 which separates the fiber from the air, which issues at the outlet 252. The fluff dry fiber pulp enters a collection region 254 which includes a bale press 256 for forming wrapped bales 16. This baled and wrapped 100% recycled paper pulp is high quality pulp ready for immediate shipment to paper manufacturers.

Directing attention back to the blow tank 232, when the output screw 234 feeds to the right, the stock passes through a valve 256 and a line 258 into a cyclone separator 260. In this separator 260 the undried fiber pulp is separated from the balled, degraded distorted plastic (B). It is to be noted that the plastic had become balled up, distorted and degraded in the cooker digester station 20 so that it is now separatable at 260 from the undried fiber pulp.

Again it is to be noted that this is a separation of degraded, distorted, balled plastic film from pulp fibers, which is entirely different in concept and operation from attempting to separate plastic film from garbage and trash per se or from waste paper per se. Thus, this aspect of the present invention provides novel process steps for separating and recovering clean pulp fiber which is precisely separated from the degraded, distorted, balled plastic particles.

This pulp fiber is fed out through a blower 262 and can be baled and sold as wet pulp. Alternatively, it is ready for immediate use in a paper-making machine. The plastic (B) passes down through a discharge valve 264 to be collected.

This is an advantageous alternative plastics recovery procedure which is provided when undried fiber pulp is being produced. These recovered plastics (B) can be recovered and reused by plastic convertors and processors. Otherwise, these plastics (B) can be disposed of as a fuel.

As shown in FIG. 4, a breaker machine 265 may be incorporated ahead of the breaking and shredding apparatus 60 (FIG. 1), in which case the magnetic separator may be relocated, as shown in FIG. 4, adjacent to the discharge end of the conveyor 56. This breaker machine 265 is shown in greater detail in FIG. 5 and includes a main feed conveyor belt 266 which is a driven conveyor having cleats 268. This main feed conveyor passes around main rolls 270 and 272 and is supported by a plurality of rollers 274 on the frame 276 to prevent sagging. A converging compactor belt 278 operates in opposition to the main feed conveyor 266 and is also driven conveyor having cleats 280. This compactor belt 278 is driven around a frame 282 having main rolls 284 and 286. There are multiple rollers 288 on the compactor frame 282 to prevent the belt 278 from undue deflection. The supports 290 and 292 for the compactor frame 282 are spring loaded downwardly by spring means 293 and 294 for maintaining the solid municipal refuse under pressure and to provide overload relief.

The garbage and trash is in a compacted state as it issues in the region at 296 from between the belts passing around the discharge rolls 272 and 286. The compacted raw waste 2 moves between a pressure bar anvil member 298 and a rotating breaker member 300 driven by a motor 302. This rotating head 300 comprises a hub carrying a multiplicity of strong protruding spikes which break up the compacted waste passing between anvil member 298 and rotating head 300. Powerful resilient loading means 304 exert a force on the axle of the breaker head 300 to urge it toward the pressure bar 298 and to allow the rotating head to retract upon overloading. A hardened face is provided on the surface of the pressure bar 298. There is a top deflector 306 above the compactor discharge region 296 to guide the raw waste into the bite between members 298 and 304. A housing 308 surrounds the breaker machine 265 and is equipped with an explosion relief door 310. A chute 312 is directed to the feed control conveyor 56, as seen in FIG. 4.

As additional comments, it is noted that the air entrained fiberized fuel 186 (FIG. 2), primarily cellulosic in nature, advantageously has low sulphur, low ash characteristics and provides approximately 8,000 Btu per pound.

In FIG. 2 the housing 174 enclosing the conveyor 172 may be provided with an air inlet damper 314 for maintaining the outlet 12 from the classification station 7 approximately at atmospheric pressure.

It is to be understood that the breaking and shredding performed in station 3 is for the purpose of rendering the solid municipal garbage and trash 2 into a feedable size capable of passing through the infeed chute 86 (FIG. 6) into the attrition classification machine 7. The size range of one-half to 6 inches given above is exemplary of feedable size pieces.

In the event that the solid municipal garbage and trash arrives in a pre-shredded or otherwise in a condition of feedable size, then the breaking and shredding station 3 can be by-passed. This feedable raw refuse can be introduced into a headbox 316 (FIG. 1) with a removable door 318 leading into the magnetic separator for removal of tramp iron and steel ahead of the attrition classification station 6. The vibratory feeder 85 serves to control the rate of feed into the attrition classification station 7 to provide a generally uniform effective rate of feed.

It is to be understood that the conveyors shown, including vibratory conveyor 85, are illustrative and that other conveyance arrangements may be used, provided that adequate provisions are made to control the feed rate and to control the materials themselves including associated dust and odors which controls are achieved by the process and apparatus as shown and described herein. For example, the garbage and trash of feedable size can be air conveyed to reach the attrition classification station 6. Advantages of using such air conveyance are that gravity selectivity, and control of materials transported is obtained to give a convenient way of rejecting oversize pieces and overdense pieces; odor control and moisture control are facilitated; and dust control is obtained.

An example of the outstanding results obtained by the process and apparatus of the present invention are shown by the following fiber test results on the pulp fiber produced from machine cleaned confetti thrashed paper 10 made from solid municipal garbage and trash from a sanitation department of an American city:

QUALITY STANDARDS* TO DESCRIBE THE RESTORED PAPER PULP FIBER PRODUCT

1. Completely defibered, fluff dried.
2. Moisture content, fluff dried fiber 5 to 12% on an oven-dry basis.
3. Color — greyish tan.
4. Fiber composition:
    Chemical pulp fibers 45–55%
        Fiber length 1.94 mm-av.; 4.32 mm-max.; 0.56 mm-min.
    Mechanical pulp fibers 55–45%
        Fiber length 1.10 mm-av.; 2.79 mm-max.; 0.35 mm-min.
5. Fiber strength characteristics, after washing:

|  | Restored Pulp Fiber Produced |
|---|---|
| Burst factor | 16 to 24.6 psi |
| Tear factor | 81 to 96.5 |
| Breaking length | 3000 to 3600 meters |
| Density | .54 g/cc |
| Freeness (Canadian Standard Freeness | 520 to 600 |

6. Contaminants:
    (a) Asphalt and waxes were hot dispersed.
    (b) Thermoplastic films, i.e. polyethylene, were removed from the restored pulp fiber produced.

*The numerical values given are subject to a tolerance of plus or minus 10%.

The construction aggregates produced had the following rough size breakdown:

| Less than 1/32" diameter | 17% |
|---|---|
| 1/32 "diameter | 60% |
| 1/16" diameter | 14% |
| 1/8" diameter | 9% |

I claim:

1. A method for the treatment of solid municipal garbage and trash for making useful products therefrom, including the recovery and restoration of distinct products which are 100 percent recycled from the garbage and trash, said method comprising the steps of:

(A) preparing a feedstock of solid municipal garbage and trash, said feedstock further essentially comprising dried paper, plastic film, glass, ceramics, grit, non-ferrous metals, hard plastics, and cellulosic garbage and plant materials, whereby said solid municipal garbage and trash is comprised of pieces in the range of approximately one-half to six inches in size, wherein further the moisture content is reduced to a range from 20% to 50% of the oven-dried basis weight of the solids comprising said feedstock, and (B) directly inputting said feedstock into an attrition classification machine, wherein said feedstock is separated into two classified streams, as the result of the following steps:

(i) downwardly impelling said feedstock into an attrition classification zone, said zone being defined by the region between a rotor means having a plurality of cutting elements projecting therefrom and a screen means positioned around said rotor means and having a plurality of openings therein, wherein said attrition classification zone applies a severe cutting, abrading, and thrashing action to said feedstock while propelling and intensely scrubbing said feedstock along the inner surface of said screen means, whereby said attrition step loosens and rejects through said screen openings the loose, soft, decayed and disintegratable matter contained in said feedstock, while also performing the step of ballistically driving through said openings the high density particles of glass, ceramics, grit, non-ferrous metal and hard plastics present in said feedstock as a first classified stream while; propelling fibrous constituents through said attrition classification zone, and along the inner surface of said screen, so as to apply a simultaneous severe chopping, cutting, scrubbing, scraping, and thrashing action upon fibrous constituents of said feedstock, and impelling said fibrous constituents as machine cleaned confetti thrashed paper, together with any chopped plastic film and light weight particles not passing through the openings of said screen, downwardly as a second classified stream; and (C) directly conveying said first classified stream to an air classification means, while subjecting said first classified stream to an air drying step previous to a gravity separation step which further includes a forced air flow, wherein said first classified stream is thereby separated into lighter fractions of fiberized fuel, carried off by said forced air flow, and heavier fractions of aggregate materials and;

(D) directly conveying said second classified stream to a separate air classification means, while subjecting said second classified stream to an air drying step previous to a ballistic separation step, which further includes a forced air flow, wherein light weight airborne confetti paper and airborne plastic film particles are separated, by said forced air flow, from heavier aggregate constituents present in the second classified stream.

2. The method of solid waste municipal garbage and trash reclamation, according to claim 1, wherein said steps of cutting, abrading and thrashing applied to said feedstock in said attrition zone includes an attrition wherein an average within the range of from 40% to 60% by dry weight of the total in-feedstock issues said zone as said second classified stream, without passing through the openings of said screen means, while an average within the range of 40% to 60% by dry weight of the feedstock in-feed passes through the openings of said screen means to issue as said first classified stream.

3. The method of solid municipal garbage and trash reclamation, according to claim 1, wherein said step of preparing said feedstock further includes the steps of magnetically separating ferrous metal constituents from raw solid municipal garbage and trash and subjecting said raw municipal solid and trash to a preliminary air drying step, whereby said initial moisture level is achieved.

4. The method of solid municipal garbage and trash reclamation, according to claim 1, wherein said step of attrition classification and impelling of the feedstock within said attrition classification zone further comprises the steps of generating an air flow by the rotation of rotor elements which are configured to also act as air impellers, wherein said air flow entrains said second classified stream and impels it through said attrition zone while assisting in clearing lightweight particles, decayed and disintegratable material which becomes said fiberized fuel particles, by blowing and driving the same through said screen openings and into said first classified stream.

5. A method for the treatment of solid municipal garbage and trash for making useful products therefrom, including the recovery and restoration of distinct products which are 100% recycled from the garbe and trash, said method comprising the steps of:

(A) preparing a feedstock of solid municipal garbage and trash, said feedstock further essentially comprising dried paper, plastic film, glass, ceramics, grit, non-ferrous metals, hard plastics, and cellulosic garbage and plant materials, whereby said solid municipal garbage and trash is comprised of pieces in the range of approximately one-half to six inches in size, wherein further the moisture content is reduced to a range from 20% to 50% of the oven-dried basis weight of the solids comprising said feedstock, and (B) directly inputting said feedstock into an attrition classification machine, wherein said feedstock is separated into two classified streams, as the result of the following steps:

(i) downwardly impelling said feedstock into an attrition classification zone, said zone being defined by the region between a rotor means having a plurality of cutting elements projecting therefrom and a screen means positioned around said rotor means and having a plurality of openings therein, wherein said attrition classification zone applies a severe cutting, abrading, and thrashing action to said feedstock while propelling and intensely scrubbing said feedstock along the inner surface of said screen means, whereby said attrition step loosens and rejects through said screen openings the loose, soft, decayed and disintegratable matter contained in said feedstock, while also performing the step of ballistically driving through said openings the high density particles of glass, ceramics, grit, non-ferrous metal and hard plastics present in said feedstock as a first classified stream while; propelling fibrous constituents through said attrition classification zone, and along the inner surface of said screen, so as to apply a simultaneous severe chopping, cutting, scrubbing, scraping, and thashing action upon fibrous constituents of said feedstock, and impelling said fibrous constituents as machine cleaned confetti thrashed paper, together with any chopped plastic film and light weight particles not passing through the openings of said screen, downwardly to a second classified stream; wherein, (C) said step of attrition classification and impelling of the feedstock within said attrition classification zone further comprises the steps of generating an air flow by the rotation of rotor elements which are configured to also act as air impellers, wherein said air flow entrains said second classified stream and impels it through said attrition zone while assisting in clearing lightweight particles, decayed and distintegratable material, by blowing and driving the same through said screen openings, and into said first classified stream, along with said ballistically separated high density particles.

* * * * *